(12) United States Patent
Fischer et al.

(10) Patent No.: US 8,134,301 B2
(45) Date of Patent: Mar. 13, 2012

(54) STEP-UP DRIVER WITH MINIMAL SWITCHING FREQUENCY

(75) Inventors: Klaus Fischer, Friedberg (DE); Josef Kreittmayr, Bobingen (DE)

(73) Assignee: OSRAM AG, Munich (DE)

( * ) Notice: Subject to any disclaimer, the term of this patent is extended or adjusted under 35 U.S.C. 154(b) by 766 days.

(21) Appl. No.: 12/223,978

(22) PCT Filed: Feb. 12, 2007

(86) PCT No.: PCT/EP2007/051319
§ 371 (c)(1),
(2), (4) Date: Aug. 14, 2008

(87) PCT Pub. No.: WO2007/096263
PCT Pub. Date: Aug. 30, 2007

(65) Prior Publication Data
US 2010/0013403 A1    Jan. 21, 2010

(30) Foreign Application Priority Data
Feb. 21, 2006    (DE) ............... 20 2006 002 761 U

(51) Int. Cl.
*H05B 41/36*    (2006.01)
(52) U.S. Cl. .............. 315/209 R; 315/291; 323/282; 323/284
(58) Field of Classification Search .......... 315/209 R, 315/291, 307, 308; 323/282, 284, 285, 290
See application file for complete search history.

(56) References Cited

U.S. PATENT DOCUMENTS

| | | | |
|---|---|---|---|
| 5,532,528 A | 7/1996 | Lammers | |
| 5,644,214 A | 7/1997 | Lee | |
| 5,680,015 A * | 10/1997 | Bernitz et al. | 315/291 |
| 6,144,568 A * | 11/2000 | Franck et al. | 363/39 |
| 7,280,337 B2 * | 10/2007 | Engel | 361/115 |
| 2004/0212356 A1 * | 10/2004 | Dowlatabadi | 323/282 |
| 2004/0263140 A1 * | 12/2004 | Adragna et al. | 323/282 |

FOREIGN PATENT DOCUMENTS

| | | |
|---|---|---|
| EP | 0507393 A2 | 10/1992 |
| EP | 0 805 548 A2 | 11/1997 |
| JP | 2043429 A | 2/1990 |
| JP | 2043429 U | 3/1990 |
| JP | 2043429 B2 | 9/1990 |
| JP | 2043429 Y2 | 11/1990 |
| JP | 5184152 A | 7/1993 |
| JP | 7231650 A | 8/1995 |
| JP | 2000166227 A | 6/2000 |
| JP | 2005218166 A | 8/2005 |

OTHER PUBLICATIONS

English language abstract of JP 2005-218166 A.
English language abstract of JP 2000-166227 A.
English language abstract of JP 07-231650 A.
English language abstract of JP 02-043429 A1.

* cited by examiner

*Primary Examiner* — Jacob Y Choi
*Assistant Examiner* — Anthony Arpin

(57) ABSTRACT

The invention relates to an electronic ballast comprising a step-up converter for operating a discharge lamp. The electronic ballast is embodied in such a way as to disconnect a switching element (T1) in the step-up converter when a maximum current value of the current flowing through the switching element is reached. The electronic ballast comprises a holding circuit (HS) which is provided with a time-function element (R27, C23) and is embodied in such a way that it sets the time-function element (R27, C23) when the switching element (TI) is disconnected and reconnects the switching element after a time interval defined by the time-function element (R27, C23).

24 Claims, 9 Drawing Sheets

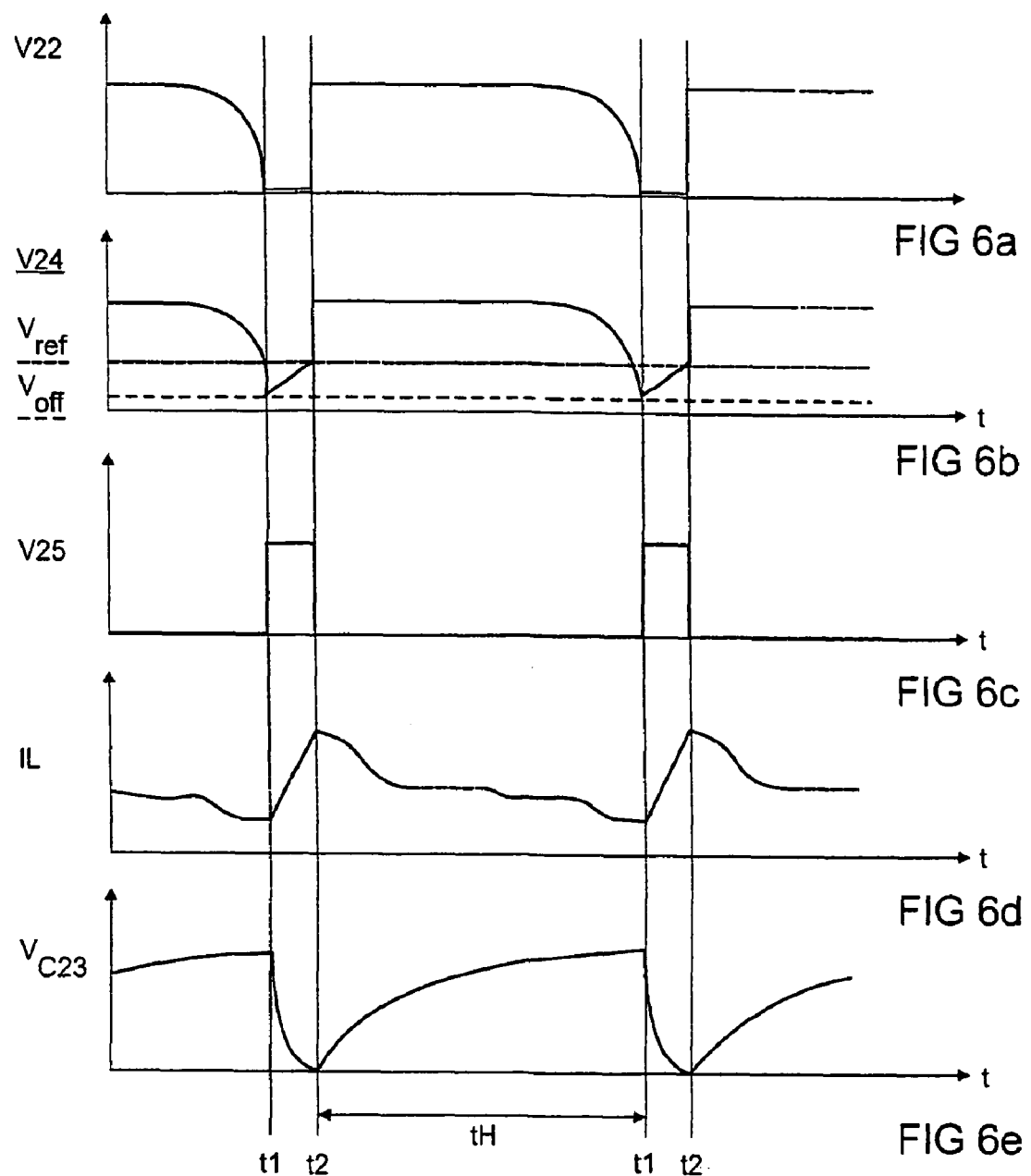

STEP-UP DRIVER WITH MINIMAL SWITCHING FREQUENCY

TECHNICAL FIELD

The present invention relates to an electronic ballast with a step-up converter for operating a discharge lamp, for example a low-pressure discharge lamp.

PRIOR ART

Electronic ballasts for operating discharge lamps are known in a variety of embodiments. They generally contain a rectifier circuit for rectifying an AC voltage supply and charging a capacitor, which is often referred to as an intermediate circuit capacitor. The DC voltage present at this capacitor is used for supplying an inverter, which operates the discharge lamp. In principle, an inverter generates a supply voltage for the discharge lamp to be operated with high-frequency current from a rectified AC voltage supply or a DC voltage supply. Similar apparatuses are also known for other lamp types, for example in the form of electronic transformers for halogen lamps.

Step-up converter circuits for the mains current harmonic reduction of ballasts for discharge lamps are known per se. They have a storage inductor, a switching element, a diode and an intermediate circuit capacitor. The intermediate circuit capacitor supplies, for example, a discharge lamp via an inverter circuit.

DESCRIPTION OF THE INVENTION

The invention is based on the technical problem of specifying an improved electronic ballast with a step-up converter.

The invention relates to an electronic ballast for a discharge lamp with a step-up converter, which has a storage inductor, a diode, an intermediate circuit capacitor and a switching element, characterized in that it is designed to switch off the switching element in the step-up converter when a maximum current value of the current flowing through the switching element is reached, and in that it has a hold circuit with a timing element, which hold circuit is designed to set the timing element when the switching element is switched off, and to switch on the switching element if a time determined by the timing element has elapsed.

Preferred configurations of the invention are specified in the dependent claims and will be explained in more detail below.

For the operation of a step-up converter it is necessary that the switching element in the step-up converter is switched on and off repeatedly. The invention is based on the idea that a timing element may be suitable as an indicator for the switch-on times of the switching element. Furthermore, the invention is based on the idea that the timing element also predetermines a specific time in which the switching element remains switched off if a previously determined event does not occur (see statements with regard to claim 2).

In the switched-on state, the switching element ensures an increasing current flow in the storage inductor up to a maximum value which can be set. In the process, the storage inductor is magnetized.

The electronic ballast according to the invention is designed in such a way that the current through the storage inductor, when the switching element is switched on, is detected, for example, by means of a measuring (shunt) resistor and, when the maximum value is reached, the switching element is switched off. Once the switching element has been switched off, the diode conducts the current impressed in the storage inductor into the intermediate circuit capacitor. This current decreases with time. If the step-up converter is being operated in the so-called "discontinuous mode", the storage inductor is completely demagnetized, with the result that there is no longer any current flowing through said storage inductor, and the series-connected diode turns off. The electronic ballast is designed in such a way that, when the switching element is switched off, the timing element is set and the switching element is only switched on again via the hold circuit after a time which is predetermined by the timing element. The step-up converter can therefore be operated at a frequency which is substantially also determined by the timing element.

The hold circuit is not only designed to switch on the switching element in the step-up converter after the time predetermined by the timing element, but also to hold the switching element in the switched-off state for this duration. This can be desirable in the case of operational faults, for example if mains overvoltages are present at the electronic ballast, in order to prevent uncontrolled switching of the switching element which may be possible.

In preferred configurations of the invention, the hold circuit switches on the switching element also on the basis of signals generated within the electronic ballast (see below).

Preferably, the electronic ballast is additionally designed to switch on the switching element of the step-up converter, i.e. to function in the "discontinuous mode", after the demagnetization of the storage inductor. After the demagnetization of the storage inductor, the step-up converter diode turns off, with the result that there is no longer any current flowing through the storage inductor and the potential between the step-up converter diode and the storage inductor is no longer determined by the intermediate circuit capacitor, but by one of the rectifier outputs. The sudden change in the potential between the storage inductor and the diode after the demagnetization of the storage inductor can therefore be considered as a demagnetization signal. The inventors have found that the demagnetization signal of the storage inductor may be suitable as an indicator of the switch-on times of the switching element. If the switching element is switched on again by the demagnetization signal, a current is again flowing through the switching element and the storage inductor. In this case, the storage inductor is remagnetized. Preferred configurations of the invention described further below relate to the detection of the demagnetization signal.

In this preferred embodiment of the invention, a switch-on and switch-off cycle can be repeated without positive control or without predetermining of times by a timing element. This can be referred to as "self-excited" oscillation. Nevertheless, this embodiment can use the hold circuit with the timing element. This is because, if, for example, mains overvoltages occur, it may arise that the input and output voltage of the step-up converter barely differ from one another or are even identical. In this case, there are also no large sudden changes in potential between the step-up converter diode and the storage inductor depending on the magnetization state of the storage inductor. In the case of mains overvoltages, the demagnetization signal can therefore no longer be detected reliably. Without a hold circuit, this can, in the case of a corresponding embodiment of the step-up converter circuit, result in the switching element of the step-up converter being switched on and off at a high frequency, although current is still flowing through the storage inductor (for example in the circuit arrangement in FIG. 1). In the worst case scenario, this can result in destruction of the switching element of the step-up converter.

As has already been mentioned above, the hold circuit is therefore designed to hold the switching element in the switched-off state, even in the case of operational faults, such as mains overvoltages, until a time predetermined by the timing element has elapsed. If, however, reliably detectable demagnetization signals are available again, the switching element is switched on again by the demagnetization signal before the time determined by the timing element.

The hold circuit therefore guarantees a minimum switching frequency even in the event of operational faults, for example mains overvoltages. Attempts are made at regular intervals to start the step-up converter. If the mains overvoltage has been reduced to a sufficient extent, the oscillation of the step-up converter is taken on again via the hold circuit as a result of the switching-on brought about by the timing element. It is therefore not necessary to detect the input and output voltage of the step-up converter in order to restart operation at a higher switching frequency after the mains overvoltages. The time predetermined by the timing element is consequently selected to be greater than the demagnetization time of the storage inductor and therefore under normal circumstances the switching element is always switched on by the demagnetization signal. If, however, no demagnetization signal occurs, the switching element is held in the switched-off state by the hold circuit during the time predetermined by the timing element. The hold circuit therefore prevents uncontrolled switching-on of the switching element in the event of the occurrence of mains overvoltages.

In a preferred embodiment, the hold circuit has a threshold value element for switching the switching element and for setting the timing element. A signal which corresponds to the current through the switching element is supplied to a control input of the threshold value element. In the simplest case, this is a voltage which is proportional to the current through the switching element. The control input of the threshold value element can be, for example, one of the inputs of an amplifier, comparator or Schmitt trigger, depending on the embodiment of the threshold value element.

If the current through the switching element reaches a maximum current determined by the threshold value of the threshold value element, the switching element is switched off via the threshold value element and the timing element is set via the threshold value element.

Preferably, the hold circuit has a hold switch and a first voltage divider. The center tap of the first voltage divider is connected to the control input of the threshold value element. The switching path of the hold switch is connected in series with the first voltage divider. If the current through the switching element reaches its maximum value, the hold switch is switched on via the threshold value element, with the result that a current flows through the first voltage divider. In each case a voltage therefore drops across the impedances of said first voltage divider. These impedances are set in such a way that the potential at the control input of the threshold value element holds the switching element in the switched-off state via the center tap of the first voltage divider.

If the hold switch is not switched on, no current flows through the first voltage divider and the potential at the control input of the threshold value element would be undefined if it were not to be additionally also interconnected in another way, which will be made clearer below.

Preferably, the control input of the threshold value element is interconnected with a second voltage divider with two impedances via the center tap thereof. If a demagnetization signal occurs, the potential at the control input of the threshold value element is set via the second voltage divider in such a way that the switching element is switched on by the threshold value element.

The hold circuit can therefore comprise the first and the second voltage divider and set the potential at the control input of the threshold value element via the first voltage divider in such a way that the switching element remains switched off.

If no current is flowing through the first voltage divider, the potential at the control input of the threshold value element is determined via the center tap of the second voltage divider (and no further signals are supplied to the control input of the threshold value element; see below). In such a circuit, the potential at the control input of the threshold value element needs to be predetermined via the center tap of the second voltage divider in the event of the occurrence of a demagnetization signal or once the time predetermined by the timing element has elapsed in such a way that the switching element is switched on.

Preferably, the hold circuit has an isolating diode, which is connected between the two impedances of the first voltage divider and also between the control input of the threshold value element and the impedance, which is connected so as to face the hold switch, of the first voltage divider. The demagnetization signal at a connecting node between the isolating diode and the impedance, which is connected so as to face the hold switch, of the first voltage divider causes a shift in potential. As a result of the shift in potential, the diode turns off; then there is no longer any current flowing through the first voltage divider. The potential at the control input of the threshold value element is then set via the second voltage divider in such a way that the switching element is switched on by the threshold value element.

As a result of this isolating diode, the two voltage dividers can therefore be decoupled. Above this takes place by means of the demagnetization signal. The first voltage divider can no longer influence the potential at the control input of the threshold value element, with the result that this potential is set via the center tap of the second voltage divider.

The preferred embodiment of the invention just described switches on the switching element by means of the demagnetization signal. In order to switch on the switching element even when there is no demagnetization signal as soon as the time predetermined by the timing element has elapsed, the hold circuit is preferably designed to switch off the hold switch as soon as the time determined by the timing element has elapsed.

Since the switching path of the hold switch is connected in series with the first voltage divider, switching-off of the hold switch means that there is no longer any current flowing through the first voltage divider and the latter can therefore no longer influence the potential at the control input of the threshold value element. In this case, too, the potential at the control input of the threshold value element is set via the above described second voltage divider in such a way that the switching element is switched on by the threshold value element.

Preferably, the electronic ballast has a transistor, whose switching path is connected between the connecting node between the impedance, which faces the hold switch, of the first voltage divider and the isolating diode and the reference potential. This transistor is switched on by the demagnetization signal via its control input. The potential at the just mentioned connecting node therefore experiences a shift in the potential in the direction of the reference potential, with the result that the isolating diode turns off.

A further preferred embodiment also has the hold circuit with the isolating diode. In this embodiment, a first signal line connects the control input of the threshold value element to a control apparatus of the electronic ballast via the isolating diode, with the result that the control apparatus can switch on the switching element via the first signal line.

It is thus possible at any time for the control apparatus of the electronic ballast to switch on the switching element, to be precise independently of the magnetization state of the storage inductor and of whether the hold switch is switched on or not. In this way, the step-up converter can also be operated in the so-called "continuous mode"; the "continuous mode" is characterized by the fact that complete demagnetization of the storage inductor does not need to take place before the switching element is switched on.

Preferably, the timing element has a series circuit comprising a resistor and a capacitor. The timing element can be connected between the control input of the hold switch and the output of the threshold value element. A diode is connected in parallel with the resistor in order to make rapid discharging of the capacitor possible after resetting of the timing element. Ideally, the hold circuit resets the timing element also when the switching element switches on. In combination with rapid discharge of the capacitor, it can be ensured, if necessary, that the capacitor is completely discharged when the timing element is next set. As a result of the diode, the resistor does not contribute to the time constant of the timing element during discharge of the capacitor. If further resistors are connected in series with the timing element, a diode can also be connected (in each case) in parallel therewith.

Preferably, a capacitor is connected in parallel with the timing element. The signal transmission can be markedly accelerated thereby because a change in voltage is transmitted differentially from the capacitor which is connected in parallel with the timing element. If, for example, the series circuit comprising the capacitor and the resistor of the timing element is connected, for example, between the output of the threshold value element and the control input of the hold switch, a change in potential at the output of the threshold value element can switch the hold switch particularly quickly.

Preferably, the electronic ballast has a second signal line, which connects the control input of the threshold value element to a control apparatus of the electronic ballast, with the control apparatus being designed to supply a modulating voltage to this control input of the threshold value element. This has the effect of a modulation of the threshold value of the threshold value element, with the result that, in this way, modulation of the gate turn-off current of the step-up converter can be carried out.

Alternatively, it is preferred to modulate the threshold value of the threshold value element directly.

Preferably, a voltage which is proportional to the instantaneous value of the voltage of the supply is supplied to the control input of the electronic ballast via the second signal line. As a result of the corresponding modulation of the gate turn-off threshold of the step-up converter, mains current harmonics are reduced.

Preferably, the sudden change in the potential between the storage inductor and the diode after the demagnetization of the storage inductor is detected by at least one coupling-out capacitor. This sudden change in potential can be used as an indicator for the switch-on time of the switching element. A resistor can be connected in series with this coupling-out capacitor. The time constant from this resistor and the coupling-out capacitor is so great that complete charging or discharging of the coupling-out capacitor does not take place during the demagnetization of the storage inductor.

In an alternative embodiment, the demagnetization of the storage inductor is detected by a secondary winding. The sudden change in potential in this case corresponds to a change in the voltage across the secondary winding, which is the transformation of the change in voltage across the storage inductor.

Preferably, an embodiment of the invention has a third signal line, which connects the control input of the switching element to a control circuit of the step-up converter. In this case, the third signal line can be connected directly to the control input of the switching element, or else indirectly via a circuit, which connects the switching element, or one or more resistors. Thus, the step-up converter can be blocked by the control circuit by means of this signal line.

A preferred embodiment of the invention has a resistor between the supply potential of the intermediate circuit capacitor and the control input of the switching element. If a sufficient voltage is present at the intermediate circuit capacitor, the switching element can be switched on via this resistor. That is to say that the oscillation can be stimulated automatically and no special control signals are required.

A preferred embodiment of the invention has a threshold value element for driving the switching element. The control input of this threshold value element is preferably connected to the potential between the storage inductor and the diode via the coupling-out capacitor and at least one resistor. Via this path, the sudden change in the potential between the storage inductor and the diode after the demagnetization of the storage inductor can be used as an input signal for the threshold value element. Furthermore, the control input of the threshold value element is connected to the potential between the switching element and the measuring resistor via at least one resistor. Via this path, the threshold value element can be controlled as a function of the current through the switching element.

With such circuitry for the components, a cycle of the step-up converter runs as follows: in a first time segment the switching element is switched on. The current through the switching element is measured via the measuring resistor, which is connected in series with the switching element. In this first time segment, this current also corresponds to the current through the storage inductor. The potential tapped off at the measuring resistor is supplied to a control input of the threshold value element, possibly via one or more resistors, as an input signal. If the value of the current exceeds a predetermined maximum, the threshold value element is switched. The required connection to the reference potential can be produced via the series circuit comprising a diode and a resistor, as proposed in the preceding paragraph. The maximum current depends on the selected dimensions for the component parts of the circuit and to this extent is predeterminable.

In particular, these component parts can be: the measuring resistor, a resistor via which the voltage across the measuring resistor is tapped off and is supplied to the control input of the threshold value element, and the resistor which produces the connection to the reference potential in series with the diode. The output of the threshold value element is connected to the control input of the switching element and switches it off. The potential between the storage inductor and the diode jumps suddenly to approximately the supply potential of the intermediate circuit capacitor when the switching element is switched off. This marks the end of the first time segment.

In a following second time segment, the switching element remains in its state as a result of the hold circuit. This state is maintained until the demagnetization signal or until the time predetermined by the timing element. Then, the hold circuit switches the switching element on again and a new cycle begins.

The above description shows that if demagnetization signals are present, the clock of the step-up converter is determined by the duration of the demagnetization of the storage inductor. The timing element predetermines the clock of the step-up converter if, from the beginning, there has been absolutely no operation with demagnetization signals or if these demagnetization signals do not occur or are too weak as a result of an operational fault, for example mains overvoltages.

Since when a supply voltage is first applied the coupling-out capacitor which is provided in any case and the intermediate circuit capacitor are charged directly by the supply voltage, the driving potential of the threshold value element cannot pass the switching threshold in a time which is markedly longer than the period duration of the switch-on/switch-off cycles of the step-up converter during operation. The threshold value element cannot be switched easily until the intermediate circuit capacitor has been charged to the instantaneous value of the supply voltage which is the greatest in terms of absolute value. During this time, the step-up converter is blocked.

Preferably, therefore, an embodiment of the invention with a threshold value element has a fourth signal line, which is connected to the control input of the threshold value element and to the control circuit. In this case, this fourth signal line can be connected to the control input of the threshold value element via the resistor from the series circuit comprising the diode and the resistor which connects the control input of the threshold value element to the reference potential. The threshold value element can be switched by the control circuit via the fourth signal line. The step-up converter is therefore no longer blocked during charging of the intermediate circuit capacitor for the first time.

The use of transistors as a simple embodiment of a threshold value element can have the disadvantage that the maximum current through the storage inductor depends on the tolerance, which may not be negligible, of the switching threshold of the transistor. In this case, the transistor can also have a driver function for the switching element.

In a further preferred embodiment of the invention, a comparator is therefore used as the threshold value element and preferably a driver circuit is connected downstream thereof. Thus, the dependence of the switch-on current threshold of the threshold value element on component part tolerances and temperature dependencies can be reduced. A driver circuit generally comprises a plurality of component parts and can have, inter alia, also one or more transistors.

As has already been described further above, the control input of the threshold value element can be connected to the reference potential via a resistor and a diode, the resistor being connected to the control input of the threshold value element.

The series circuit comprising the coupling-out capacitor and the resistor can be joined to the node between this resistor and the diode. Preferably, in an embodiment of the invention, a capacitor is connected in parallel with the resistor at the control input. The capacitor acts as a differentiating element, with the result that the sudden change in the potential after the demagnetization of the storage inductor is transmitted differentially to the input of the comparator, which can accelerate driving.

A reference signal is present at one input of the comparator, and the signals of interest are present at the other input, which signals are generated by the measuring resistor and the coupling-out capacitor. Preferably, a DC voltage is superimposed on this signal input and raises the potential of this input further in relation to the reference potential. For this purpose, the input node of the comparator can be connected to the supply potential of the comparator, for example via a resistor.

In a preferred embodiment of the invention, the reference signal is proportional to the instantaneous value of the supply voltage. The current consumption of the step-up converter can therefore be approximately sinusoidal.

It is often desirable to operate step-up converters optionally directly on the mains supply or using a phase gating dimmer. In this case, the step-up converter must possibly match its operation to a supply with or without a phase gating dimmer. This may be the case, for example, if the operation of the step-up converter in one of the two cases does not run in a manner conforming to standards as regards the mains current harmonics or the step-up converter does not function efficiently in one of the two cases without its operation being converted. It must then be possible for the electronic ballast to identify whether it is being operated directly on the mains supply or using a phase gating dimmer; in this case corresponding operational parameters can be set, for example the gate turn-off current threshold.

Operation using a phase gating dimmer changes the supply voltage which is present at the electronic ballast in characteristic fashion. This is utilized by the invention.

Phase gating dimmers provide the mains supply to the ballast only after a settable time within each mains half-cycle. During phase gating there is no input voltage present at the ballast. After this time, approximately the original supply voltage is present.

The voltage at the input of the electronic ballast has a steep edge after the phase gating; sudden changes in supply voltage occur.

An embodiment of the invention has a differentiator which is connected between a mains line and the reference potential of the ballast. This differentiator couples out the sudden changes in the supply voltage. At its output, relatively high peak voltages in terms of absolute value occur in the case of a sudden change in the voltage. These peak voltages, after possible further-processing, for example in the form of peak value identification, can be supplied to a control circuit of the step-up converter, which can then set the operational parameters of the step-up converter correspondingly.

During optional operation of step-up converters using a phase gating dimmer or directly on the mains supply, particular problems result. If, for example, the step-up converter is designed exclusively for operation using a phase gating dimmer, such as that from EP 1 465 330 A2, in this case the lack of a phase gating dimmer can result in the following problem: from the time within a mains half-cycle of the supply mains at which the intermediate circuit capacitor has been charged sufficiently, the current supply to the discharge lamp is generally interrupted during the remaining time of this half-cycle. Since there is no phase gating during direct operation on the supply mains, it is possible that the step-up converter will no longer draw any current relatively early within a mains half-cycle. The power factor as a quotient of the active power and the apparent power is low. Furthermore, a current consumption of beyond 90° phase angle must be ensured, inter alia, in accordance with the standard IEC 61000-3-2.

Preferably, the electronic ballast detects, by means of the differentiator, whether a phase gating dimmer is connected upstream. If the ballast is operating directly on the mains supply, the operational parameters of the step-up converter are set in such a way that the latter can function in a manner conforming to standards. This can take place by means of a reduction of the gate turn-off current threshold of the step-up converter. The step-up converter then draws a current with a lower amplitude. In order to charge the intermediate circuit capacitor to its maximum value, current is now drawn by the step-up converter over a longer period of time within a mains half-cycle. The gate turn-off current threshold can be set, in order to perform to the standard, in such a way that the current consumption of the step-up converter extends to beyond the phase angle of 90°.

The longer the time interval of the current consumption within a mains half-cycle, the greater the power factor of the ballast is as well. Preferably, the operational parameters, in particular the gate turn-off current threshold, of the step-up converter are set in such a way that the current consumption in the absence of a phase gating dimmer takes place at least over half the duration of a mains half-cycle.

In a particularly simple and therefore preferred embodiment of the invention, the differentiator has a series circuit comprising a capacitor and a resistor. This series circuit can be connected to one of the mains lines in series with the reference potential of the electronic ballast. A further capacitor can be connected to the other mains line by the node between the resistor and the capacitor. Given suitable values for the capacitance and the resistance, a voltage which is proportional to the differentiated supply voltage is present at the resistor. An advantage of this simple implementation is the low number of component parts which are required.

Preferably, a peak value detection circuit is connected in parallel with the resistor from the differentiating circuit described in the preceding paragraph. If the step-up converter is operated using a phase gating dimmer, the controller of the step-up converter can be driven by the peak value detected via the resistor, for example by means of a switching element connected to the peak value detection means.

The description above and below of the individual features relates to the electronic ballast and to a discharge lamp with an integrated electronic ballast according to the invention. With the individual features the description also relates to a method corresponding to the invention for operating an electronic ballast. This is the case even when no explicit mention is made in detail of this.

The invention therefore in principle also relates to a method for operating an electronic ballast for a discharge lamp with a step-up converter which has a storage inductor, a diode, an intermediate circuit capacitor and a switching element, characterized in that the switching element in the step-up converter is switched off when a maximum current value of the current flowing through the switching element is reached, and in that the ballast has a hold circuit with a timing element, which hold circuit sets the timing element when the switching element is switched off and switches on the switching element if a time determined by the timing element has elapsed.

BRIEF DESCRIPTION OF THE DRAWINGS

The invention will be explained in more detail below with reference to exemplary embodiments. The individual features disclosed in the process can also be critical to the invention in other combinations. The description above and below relates to the apparatus category and the method category of the invention, without this being explicitly mentioned in detail.

FIGS. 6a, b, c, d, e show relevant current and voltage profiles of the circuit arrangement from FIG. 5.

PREFERRED EMBODIMENT OF THE INVENTION

For better understanding of the way in which the invention functions, FIGS. 1 to 4 first show a step-up converter circuit without the hold circuit according to the invention. This hold circuit is then shown in FIG. 5 and explained further below.

Figure 1:
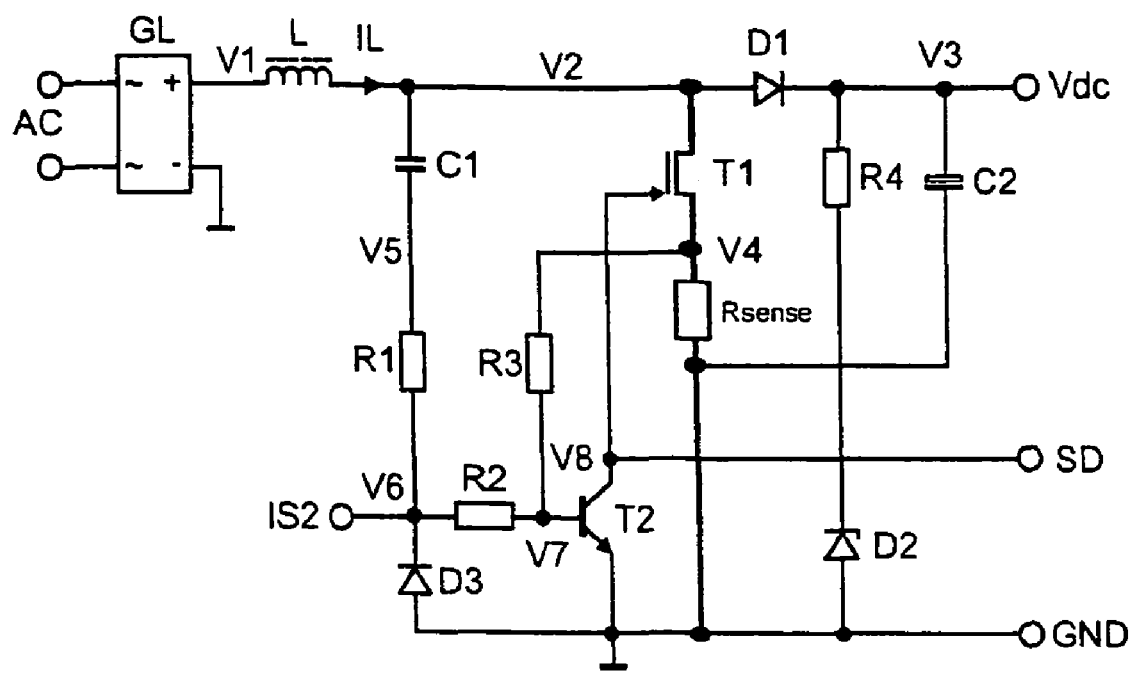
FIG. 1 shows a step-up converter circuit which is used to explain features of the invention but is not an exemplary embodiment of the invention.

A voltage, which is supplied via an AC voltage input AC and is rectified by a rectifier GL, is present at the circuit arrangement in FIG. 1 between a node V1 and a reference potential GND.

A first series circuit comprising a storage inductor L, a diode D1 and an intermediate circuit capacitor C2 is connected to the output of the rectifier.

The connection between the storage inductor L and the diode D1 represents a node V2. A series circuit comprising a switching element T1 and a (measuring or shunt) resistor Rsense is connected between the node V2 and the reference potential GND. The switching element T1 may be in the form of a MOSFET. The resistor Rsense is connected to the reference potential GND. A node V8 is at the potential of the control input of the switching element T1.

A threshold value element T2 is connected between the control input of the switching element T1 and the reference potential GND. The threshold value element T2 may be in the form of a (bipolar) transistor. Further below there is an exemplary embodiment with a comparator as the threshold value element. A node V7 is at the potential of the control input of the threshold value element T2.

A resistor R3 connects a node V4 between T1 and Rsense to the node V7.

A series circuit comprising a coupling-out capacitor C1, a resistor R1 and a diode D3 is connected between the node V2 and the reference potential GND. A node V6 is at the connection between the resistor R1 and the diode D3.

A resistor R2 is between the node V6 and the node V7. A node V3 is at the connection between the diode D1 and the capacitor C2.

A series circuit comprising a resistor R4 and a diode D2 is connected between the node V3 and the reference potential GND. The connecting node between the diode D2 and the resistor R4 is connected to the control input of the first switching element T1. The diode D2 is in the form of a zener diode.

A signal line IS2 is connected to the node V6. This signal line can be set to the reference potential GND for a short period of time by a control circuit.

A second signal line SD is connected to the control input of the switching element T1. The control circuit can block the step-up converter by means of this signal line.

FIG. 2a shows the potential at the node V6 and at the node V4 as functions of time. A current IL flows through the storage inductor L. A voltage, which is proportional to the current IL through the storage inductor L, is measured at the node V4 by means of the resistor Rsense. The potential reproduces the magnetization state of the storage inductor L at the node V6. This is brought about by means of the coupling-out capacitor C1. If the storage inductor is magnetized, the coupling-out capacitor C1 is discharged. The potential at the node V6 in this case corresponds to approximately the reference potential GND because it is clamped by the diode D3 to a negative value, which corresponds to the conducting-state voltage, with respect to the reference potential GND. If the storage inductor L is then demagnetized, the coupling-out capacitor C1 is charged. A potential is formed at the node V6 which is markedly above the reference potential GND.

The coupling-out capacitor C1 is dimensioned in such a way that the time constant from the capacitance C1 and the resistance R1 is so great that complete charging of the coupling-out capacitor C1 does not take place during the demagnetization of the storage inductor L, in time interval tb, and the potential at the node V6 remains above the switch-on threshold of the threshold value element T2.

Figure 2:
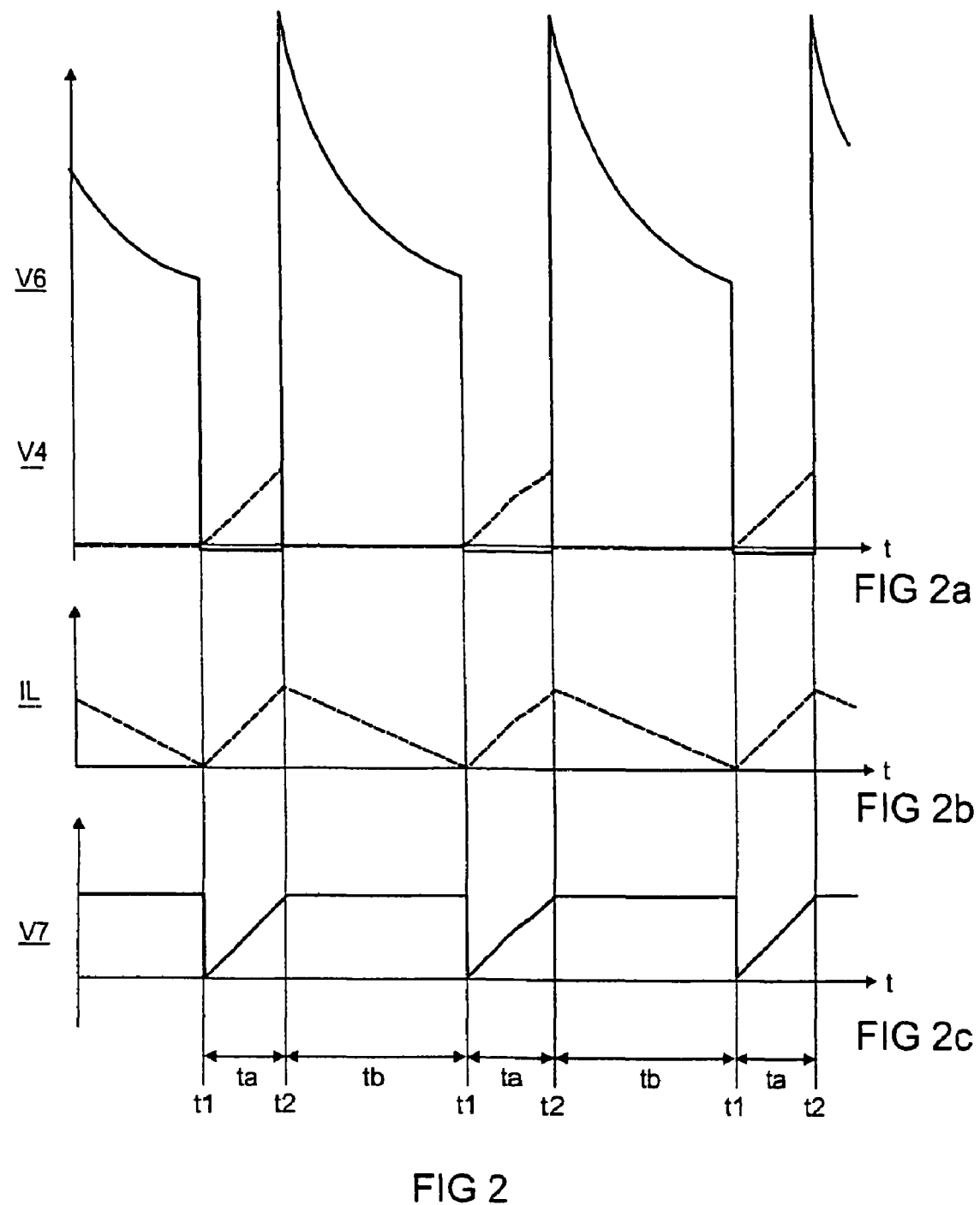
FIGS. 2a, b, c show relevant current and voltage profiles of the circuit arrangement from FIG. 1.

FIGS. 2 a, b, c show intervals ta and tb and times t1 and t2, which correspond to the relevant time segments.

FIG. 2b shows the current IL through the storage inductor L as a function of time. FIG. 2c shows the potential at the node V7 as a function of time.

In phase ta, the switching element T1 is switched on and the threshold value element T2 is switched off. The potential present at the node V4 increases proportionally to the current IL through the storage inductor. The potential at the node V6 in this case approximately corresponds to the reference potential GND. If the potential at the node V7, which is connected to the node V4 via the resistor R3, exceeds the switch-on threshold voltage of the threshold value element T2, the threshold value element T2 is switched on and the switching element T1 is switched off. The maximum current is therefore also limited by the step-up converter. The corresponding time t2 defines the end of the time interval ta.

The time interval tb follows the time t2. The threshold value element T2 is switched on at the time t2 indirectly by the potential at the node V4 via the resistor R3. In this case, the switching element T1 is switched off by the threshold value element T2. At the node V6, the potential changes suddenly, at time t2, to a value which is markedly above the reference potential GND. The storage inductor is demagnetized during the time interval tb.

A current flows through C1, R1 and R2 to the control input of the threshold value element T2 and holds this threshold value element T2 switched on as long as the demagnetization current is flowing. The switching element T1 is switched off since the potential at its control input no longer exceeds the switch-on threshold.

The time interval tb ends with the complete demagnetization of the storage inductor L. The potential at the node V2 therefore changes suddenly to the potential at the node V1 at the end of time interval tb. This sudden change defines the time t1 and brings about a potential, via the coupling-out capacitor C1, the resistor R1 and the diode D3, at the node V6 which approximately corresponds to the reference potential GND. At the control input of the threshold value element T2, the potential is no longer sufficient for holding the threshold value element T2 in the switched-on state. It turns off.

The voltage across the intermediate circuit capacitor C2 now switches on the switching element T1 via the resistor R4.

A new phase ta begins again. The high-frequency oscillation of the step-up converter continues to run automatically.

At the start of the oscillation, two cases can be distinguished from one another. In the first case, the threshold value element T2 is switched off and a sufficient voltage is present at the intermediate circuit capacitor C2. Then, the switching element T1 is switched on by the voltage across the intermediate circuit capacitor via R4. In the second case, the control circuit can set the voltage at the node V6 for a short period of time to the reference potential GND via the signal line IS2. As a result, the switching element T1 is switched on via the resistor R4.

The second case can occur if, when the supply voltage AC is applied for the first time, the capacitors C1 and C2 are charged in parallel to the potential V1. The potential V6 then cannot fall below the switch-on threshold voltage of the threshold value element T2 during a time which is markedly longer than the period duration of the step-up converter. The threshold value element T2 cannot be switched off until the charging of the intermediate circuit capacitor C2 to the highest instantaneous value of the supply voltage has come to an end.

In this state, the step-up converter is blocked by the threshold value element T2.

The control circuit can block the operation of the step-up converter at any time via the signal line SD. This can take place, for example, when a desired voltage at the intermediate circuit capacitor C2 is reached.

The threshold value element T2 has a plurality of functions in a circuit arrangement as described above: firstly it is a threshold value element for detecting signals at the node V7; the second function is to drive the switching element T1. Furthermore, the threshold value element also functions as an inverter.

In the circuit arrangement shown in FIG. 1, the resultant maximum current through the storage inductor L is dependent on the tolerance of the switching threshold of the threshold value element T2.

Figure 3:
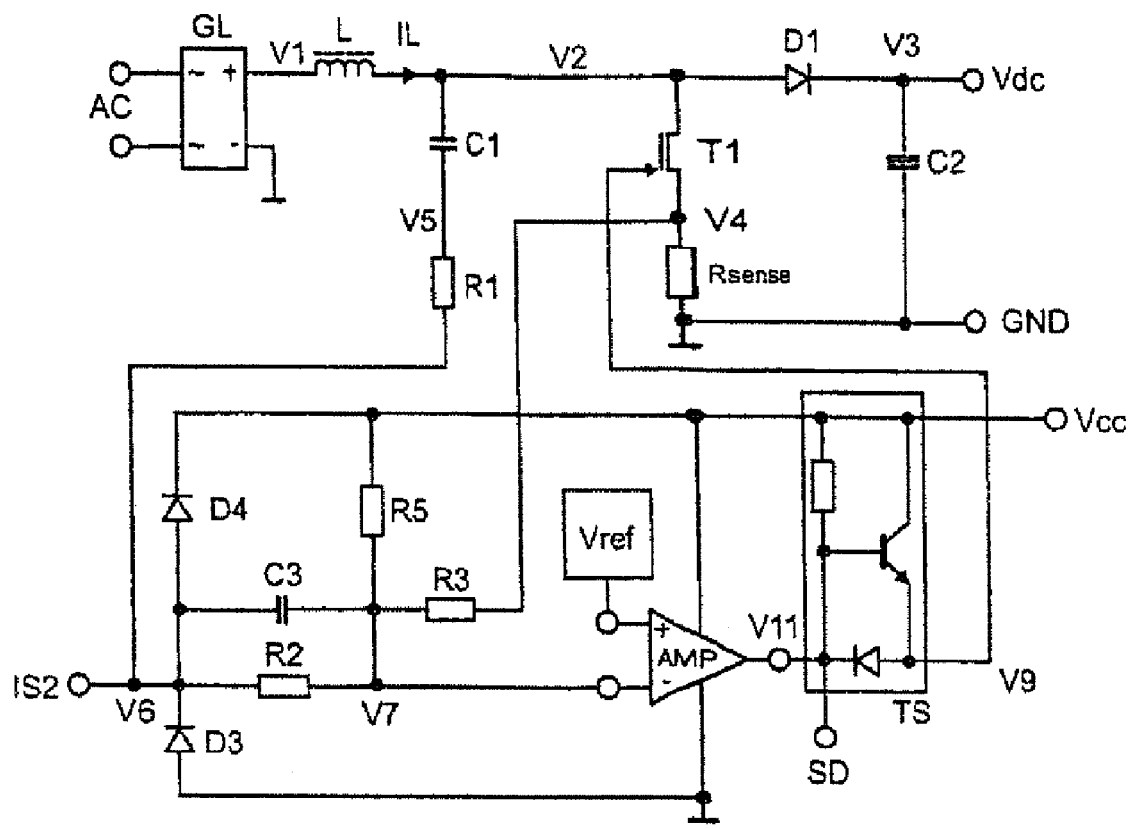
FIG. 3 shows a modification of the circuit arrangement from FIG. 1.
Figures 4A, 4B, 4C:
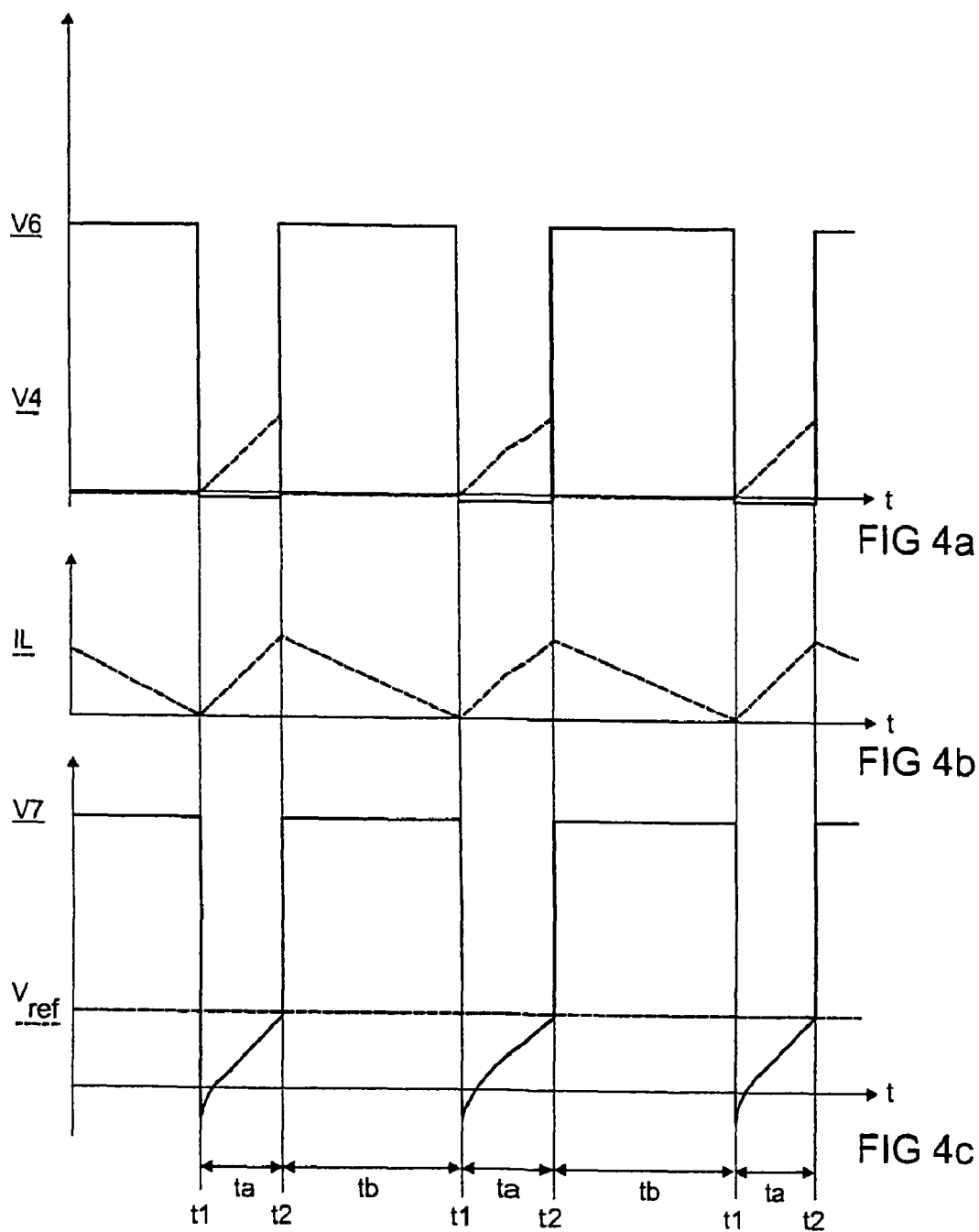
FIG. 4a, b, c show relevant current and voltage profiles of the circuit arrangement from FIG. 3.

FIG. 3 shows a circuit diagram for a second circuit arrangement according to the invention which is improved in this regard.

The threshold value element used is not a transistor but a comparator AMP with a downstream driver circuit TS. Since the comparator AMP cannot by itself make available the power for driving the switching element T1, the driver circuit TS is connected downstream of it. The comparator AMP is supplied a separate voltage supply Vcc. A diode D4 is connected between the node V6 and the positive supply potential Vcc. A capacitor C3 can be connected in parallel with the resistor R2. This accelerates the increase in potential at the node V7 when the potential at the node V6 increases at time t1 because it transmits the sudden change in potential differentially. C3 is recharged markedly more quickly than the increase in the voltage at the node V7 by the increase in the current IL. The effect has already been taken into consideration in FIG. 2c. The capacitor C3 is illustrated in FIG. 3. A resistor R5 is connected to the supply voltage Vcc between the capacitor C3 and the resistor R3.

A gate turn-off threshold Vref is supplied to an input of the comparator AMP. This corresponds to the switch-off criterion for the switching element T1. It an be set so as to be constant or else variable, for example proportional to the profile of the input voltage AC.

The input of the comparator should not be subjected to excessively high voltages. The disconnection of the switching element T1 at time t2 causes a sudden change in voltage at the node V7. In order to limit this sudden change, a diode D4 is connected from the node V6 to the positive supply potential Vcc of the comparator. As a result, the voltage at the node V6 is limited to a potential which is higher than the supply potential Vcc of the comparator by the conducting-state voltage of the diode D4; see FIG. 4.

In order to reduce the sensitivity to interference of the comparator, a so-called pull-up resistor R5 is connected between the node V7 and the positive supply potential Vcc. The potential at the node V7 is raised with respect to the reference potential thereby. As a result, the signal deviation is reduced, but the measure may nevertheless be advantageous because the signal-to-noise ratio can be improved.

If considerable mains overvoltages occur, it may arise that the input voltage of the step-up converter circuit assumes similar values to the output voltage. In this case, the potential V2 does not have any clearly identifiable sudden changes in potential as a function of the magnetization state of the storage inductor L between the storage inductor L and the diode D1 (see FIGS. 1 and 3). The potential V2 in this case therefore does not provide any noticeable sudden change in potential after the demagnetization of the storage inductor for the purpose of switching on the switching element T1; furthermore it can also no longer be used as a hold signal by means of which the switching element T1 remains switched off during the demagnetization of the storage inductor L.

In the circuit arrangement in FIG. 1, this could, for example, have the result that the switching element T1 is switched on in an uncontrolled manner via the resistor R4, even if a current is still flowing through the storage inductor L. An undesirable high-frequency switching of the switching element T1 is thus possible.

Figure 5:
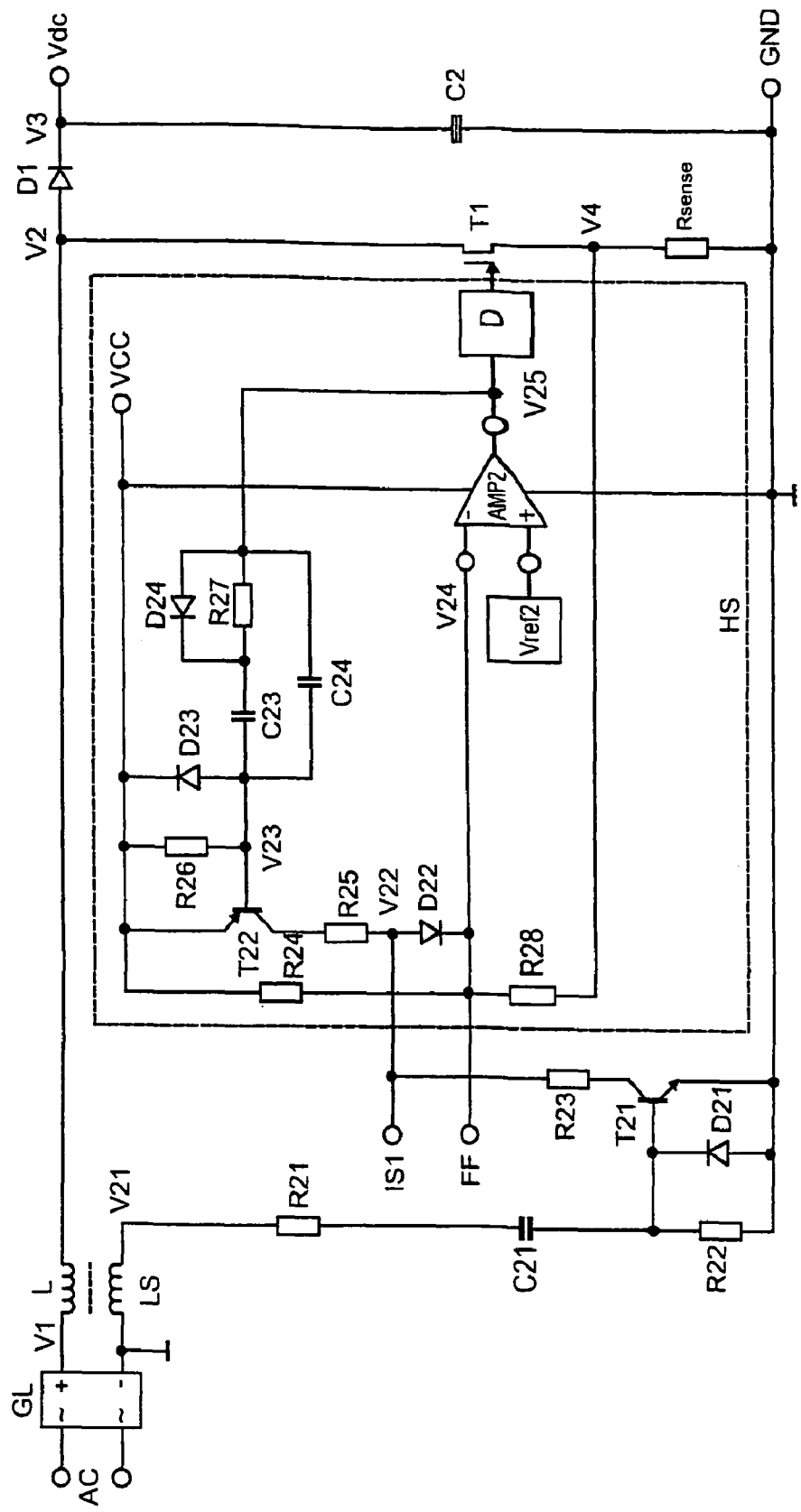
FIG. 5 shows a step-up converter circuit as a constituent part of an electronic ballast according to the invention.

FIG. 5 now shows a circuit arrangement according to the invention. The step-up converter circuit shown in FIG. 5, which is a constituent part of an electronic ballast according to the invention, guarantees a minimum switch-on frequency of the switching element T1 in the case of mains overvoltages and at the same time prevents uncontrolled switching-on thereof.

The circuit in FIG. 5 is supplied via a rectified AC voltage precisely in the same way as in FIG. 1 or 3. The series circuit comprising the storage inductor L, the diode D1 and the intermediate circuit capacitor C2 shown in FIG. 1 is also provided here and is likewise connected. Furthermore, precisely as in FIG. 1, a series circuit comprising a switching element T1 and a measuring resistor Rsense is connected in parallel with the diode D1 and the intermediate circuit capacitor C2. The same reference numerals are used for these component parts in FIGS. 1 and 5.

FIG. 5 shows a hold circuit HS. This hold circuit has a dedicated supply potential terminal VCC. A series circuit comprising a resistor R24 and a resistor R28 is connected between the supply potential VCC and a node V4, which is connected between the switching element T1 and the measuring resistor Rsense. The center tap of said series circuit is connected to the inverting input of a comparator AMP2. A reference voltage Vref2 is present at the non-inverting input of the comparator AMP2. The output of the comparator AMP2 is connected to the control input of the switching element T1 via a driver D. For supply purposes, the comparator AMP2 is connected between the supply potential VCC and the reference potential GND. A series circuit comprising a bipolar transistor T22, a resistor R25 and a diode D22 is connected in parallel with the resistor R24.

A series circuit comprising a capacitor C23 and a resistor R27 is connected between the control input of the bipolar transistor T22 and the output of the comparator AMP2. A diode D24 is connected in parallel with the resistor R27, and a capacitor C24 is connected in parallel with the capacitor C23 and the resistor R27. A resistor R26 is connected between the control input of the transistor T22 and the supply potential VCC, and a diode D23 is connected in parallel with the resistor R26.

As a deviation from FIG. 1 or 3, the potential V2 between the storage inductor L and the diode D1 is not coupled out via a capacitor (C1 in FIGS. 1 and 3) but via a secondary winding LS on the storage inductor L (but naturally the demagnetization signal could also be coupled out capacatively here). A resistor R1, a capacitor C21 and a resistor R22 are connected in this sequence between the secondary winding LS and the reference potential GND. A resistor R23 and the switching path of a transistor T21 are connected between a node V22 between the resistor R25 and the diode D22 and the reference potential GND. The control input of the transistor T21 is connected to a node between the capacitor C21 and the resistor R22. A diode D21 is connected in parallel with the resistor R22.

A signal circuit IS1 is connected to the node V22, and a signal line FF is connected to the inverting input of the comparator AMP2.

FIG. 6 shows the profile of the current IL through the step-up converter and a few relevant potential profiles for the case in which the AC voltage supply has mains overvoltages and a sudden change in the potential V2 between the storage inductor L and the diode D1 after the demagnetization of the storage inductor L cannot be coupled out.

Precisely as in the circuit arrangements in FIGS. 1 and 3, the current through the switching element T1 increases in the course of time when said switching element T1 is switched on.

Correspondingly, the potential at a node V4 between the switching element T1 and the measuring resistor Rsense increases. Since the inverting input of the comparator AMP2 is connected to the node V4 via the resistor R28, the potential at said input also increases. As long as this potential remains below the reference voltage Vref2 acting as the threshold, the output of the comparator AMP2 is at a high resistance (logic one) in comparison with the reference potential GND. If the potential at the inverting input of the comparator AMP2 reaches the threshold Vref2, the output of the comparator AMP2 attains a low resistance value (logic zero) and the switching element T1 is switched off via the driver D. A current then flows through the series circuit comprising the resistor R26, the capacitor C23 and the resistor R27. The bipolar transistor T22 is switched on by the voltage drop which is then present across the resistor R26. The capacitor C23 is first discharged and is charged to an increasing extent as the current flow continues. The charge time of the capacitor C23 determines how long a current can flow through it and a voltage which is holding the transistor T2 in the switched-on state can drop across the resistor R26.

As long as the transistor T22 is switched on, a current flows through the series circuit comprising the switching path of the transistor T22, the resistor R25, the diode D22, the resistor R28 and the measuring resistor Rsense. This current sets the potential at a node V24 between the diode D22 and the resistor R28, i.e. at the inverting input of the threshold value element AMP2, to a value of greater than Vref2; see FIGS. 6 a and b. As a result, the output of the comparator AMP2 remains at logic zero, although no current is flowing through the switching element T1 any more. This hold signal is independent of the profile of the potential V2 between the storage inductor L and the diode D1.

The charge time of the capacitor C23 determines a hold time tH. If the capacitor has been sufficiently charged, a sufficient current can no longer flow and a sufficient voltage no longer drops across the resistor R26; the transistor T22 is switched off; see FIG. 6 e.

The potential V24 at the inverting input of the comparator AMP2 is therefore no longer influenced by the resistors R25 and R28 representing the first voltage divider, but by the current through the resistors R24 and R28 representing a second voltage divider. This voltage divider is designed in such a way that the potential at the inverting input of the comparator AMP2 falls to a value below the reference potential Vref2 and the comparator AMP2 now switches the switching element T1 on again via the driver element D.

In FIGS. 6a and 6b it can be seen from the potentials at the nodes V22 and V24 that the switching element T22 is not switched off infinitely quickly, and therefore the edges are not infinitely steep.

Owing to the mains overvoltage, the current IL through the step-up converter T1 can assume a nonuniform profile, which is indicated by a corresponding curve shape in FIG. 6d.

FIG. 7 shows the current through the step-up converter and a few relevant potential profiles for normal operation of the circuit arrangement shown in FIG. 5, i.e. without mains overvoltages.

In this case, sudden changes in the potential V2 between the storage coil L and the diode D1 which clearly indicate demagnetization of the storage coil L can be coupled out via the secondary winding LS. If the secondary winding LS detects a correspondingly severe drop in potential, the transistor T21 is switched on thereby. The potential at the node V22 falls to a value below the reference potential Vref2. Thereupon, the comparator AMP2 switches on the switching element T1 via the driver D.

Figures 7A, 7B, 7C:
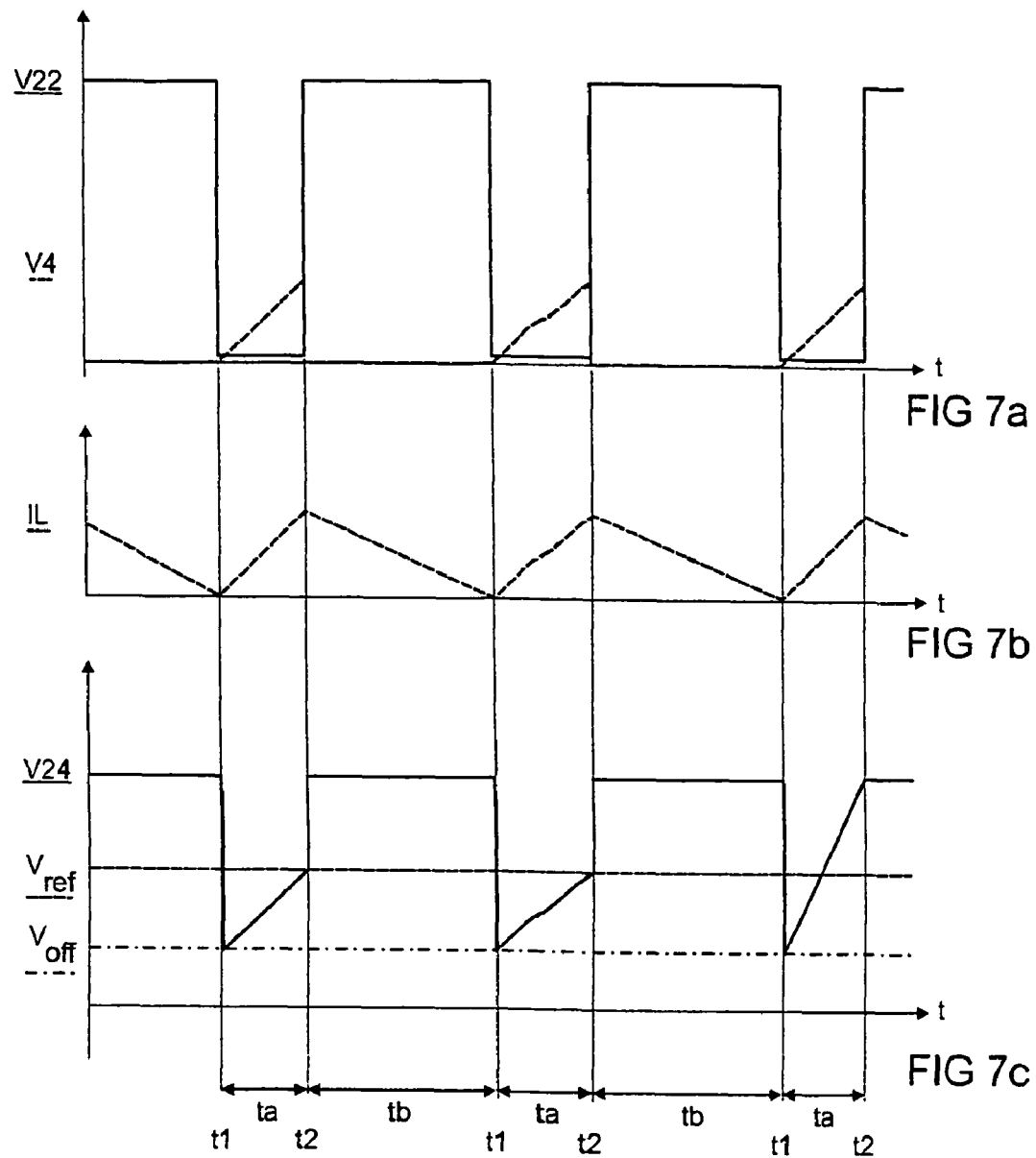
FIGS. 7a, b, c show further relevant current and voltage profiles of the circuit arrangement from FIG. 5.

FIG. 7b shows how the current in the storage inductor L increases when the switching element T1 is switched on during the time interval ta.

If the current through the switching element T1 exceeds its value determined by the threshold value Vref2, the switching element T1 is switched off again via the comparator AMP2 and the driver D. Even during normal operation a current then flows through the capacitor C23 and the resistor R27, and the transistor T22 is switched on via the resistor R26. Then, the voltage divider comprising the resistors R25 and R28 draws the potential V24 at the inverting input of the comparator AMP2 to a value above the reference value Vref2 and thus holds the switching element T1 in the switched-off state via the comparator AMP2 and the driver D.

After a time tb, the secondary winding LS detects demagnetization of the storage coil L again and switches the transistor T21 on again. The potential at the node V22 falls to a value below the reference potential Vref2, the diode D22 turns off, the potential at the inverting input of the comparator AMP2 is determined via the second voltage divider R24, R28 and the switching element T1 is switched on again. In contrast to FIGS. 6a and 6b, the potential at the node V22, see FIG. 7a, has an extremely steep edge prior to the switching element T1 being switched on.

Without mains overvoltages, the current IL through the step-up converter falls linearly as the demagnetization of the storage inductor L increases.

The diode D24 is connected in parallel with the resistor R27, and the diode D23 is connected in parallel with the resistor R26, in order that, in a time during which the switching element T1 is switched on, the capacitor C23 is discharged as quickly as possible. This can ensure that the capacitor C23 is completely discharged when the switching element T1 is next switched off.

The switching-on of the transistor T22 is accelerated by the capacitor C24 since it transmits the decrease in the output potential of the comparator AMP2 differentially to the control input of the transistor T22.

The switching-on of the transistor T22 is therefore independent of the absolute values of the potential at the output of the comparator AMP2. This prevents the comparator output from rebounding.

The node V22 is interconnected with a control apparatus of the electronic ballast via a signal line IS1. Via this control apparatus, the switching element T1 can be switched on at any time independently of the magnetization state of the storage inductor L and of the state of charge of the capacitor C23. For this purpose, the potential at the node V22 must merely be drawn to a value below the reference potential Vref2. Operation of the step-up converter in the "continuous mode" is therefore also possible.

The center tap of the second voltage divider R24, R28 is interconnected likewise with the control circuit of the electronic ballast via the signal line FF. Via this signal line FF, a voltage which is proportional to the AC voltage AC is added to the inverting input of the comparator AMP2. This acts as a corresponding modulation of the reference potential Vref2 and results in sinusoidal modulation of the gate turn-off current threshold of the step-up converter circuit.

Figure 8:
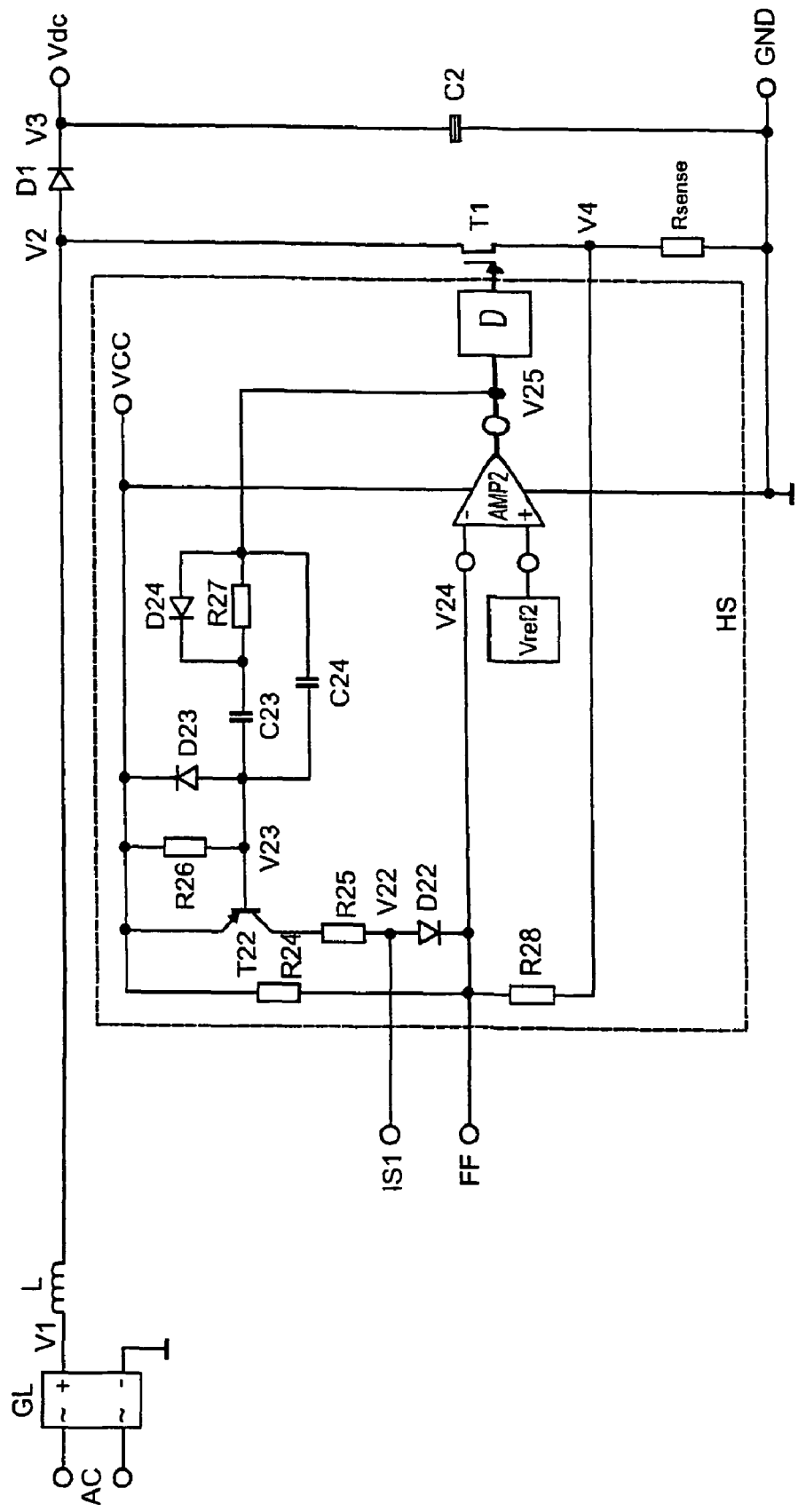
FIG. 8 shows a modification of the circuit arrangement from FIG. 5.

FIG. 8 shows a modification of the circuit arrangement from FIG. 5. In this circuit arrangement, the demagnetization signal is not coupled out at all and is correspondingly also not used as an indicator for the switch-on time of the switching element T1. This circuit arrangement also represents a functional step-up converter. The mode of operation corresponds to the mode of operation explained with reference to FIGS. 5 and 6 but without calculable demagnetization signals. The switch-on times of the switching element T1 are determined as described above by the hold circuit HS with the timing element R27, C23.

Figure 9:
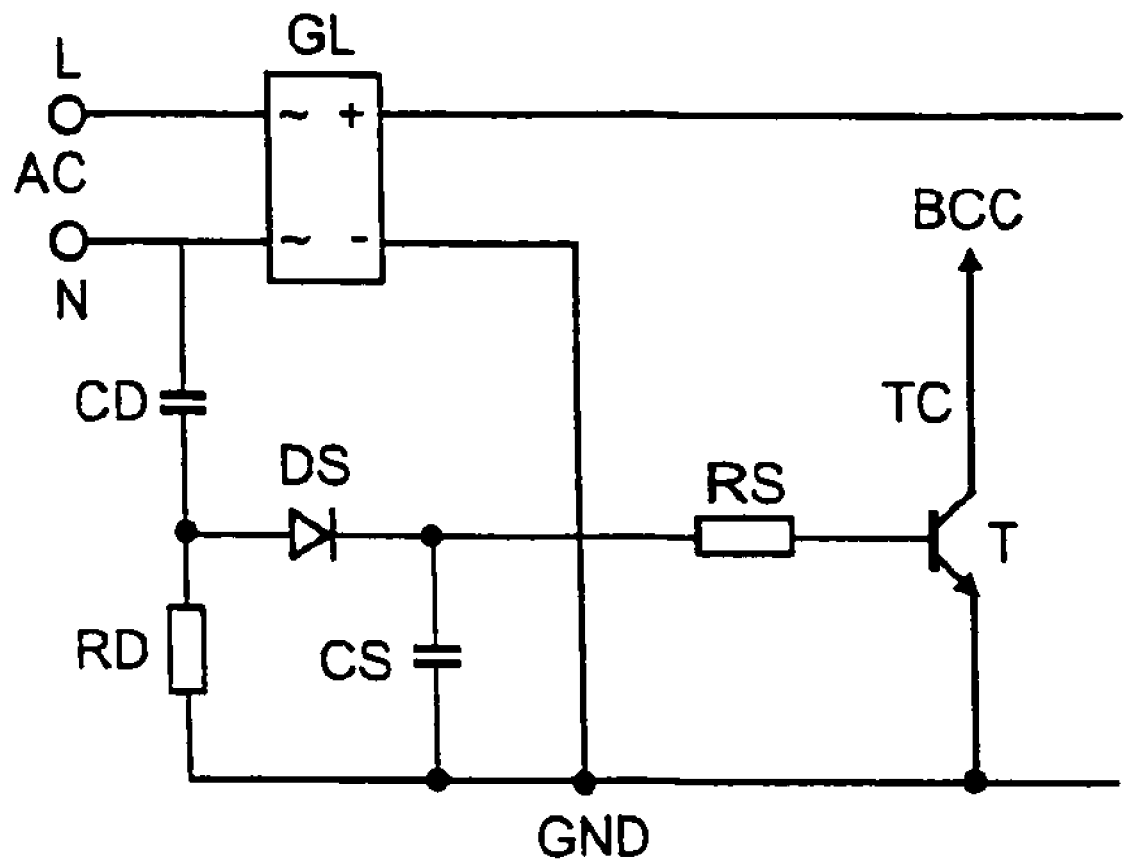
FIG. 9 shows a circuit arrangement for detecting phase gating in the supply voltage.

FIG. 9 shows a circuit arrangement according to the invention for identifying whether the electronic ballast is being operated directly on the supply mains or using a phase gating dimmer.

A capacitor CD is connected, as a differentiating element, to one of the mains feed lines N or L. A resistor RD, which connects the capacitor CD to the reference potential GND, is connected in series with this capacitor CD. The anode of a diode DS, whose cathode is connected in series with a further capacitor CS likewise to the reference potential GND, is connected to the node between the capacitor CD and the resistor RD. This circuit represents a peak value detection circuit of the voltage occurring across the resistor RD. At the node between the capacitor CS and the diode DS, the base of a transistor T is connected via a resistor RS. The emitter is connected to the reference potential GND and the collector TC is connected to elements of the step-up converter which can influence the sequence of the step-up converter operation. Specific circuits are specified further below.

If the electronic ballast is connected directly to the mains supply, no substantial sudden changes in the supply voltage occur. The component parts of the circuit arrangement in FIG. 9 are designed in such a way that the peak value of the voltage across RD is stored via the diode DS in the capacitor CS and the voltage across the capacitor CS cannot switch the transistor T on.

If the electronic ballast is connected to the supply mains via a phase gating dimmer, the supply voltage demonstrates considerable sudden changes. In this case, high peak values occur across the resistor RD, with the result that the capacitor CS is charged to considerably higher values in comparison with operation without a phase gating dimmer. The voltage across the capacitor CS can now move the transistor T over into a conducting state via the resistor RS, whereby the collector-side output of the transistor TC is connected to the reference potential GND. The step-up converter can be addressed via the output TC of the transistor T, with the result that the gate turn-off current threshold is reduced.

In FIG. 1, the gate turn-off current threshold is determined by the resistors R2 and R3. If a resistor is switched from the potential at the node V7 to the reference potential GND via the switch T, the resultant desired value is greater if the switch T is switched on.

In FIG. 3, the gate turn-off current threshold is determined by the reference voltage Vref. The voltage Vref can be generated by a voltage divider circuit comprising resistors. A resistor can be connected in parallel with one of these resistors via the switch T. Switching the switch T on and off therefore changes the reference voltage Vref.

The invention claimed is:

1. An electronic ballast for a discharge lamp with a step-up converter, which has a storage inductor, a diode, an intermediate circuit capacitor and a switching element, wherein: the electronic ballast is designed to switch off the switching element in the step-up converter when a maximum current value of the current flowing through the switching element is reached, and wherein the electronic ballast has a hold circuit with a timing element, which hold circuit is designed to set the timing element when the switching element is switched off, and to switch on the switching element if a time determined by the timing element has elapsed, wherein the hold circuit has: a threshold value element for switching the switching element and for setting the timing element, with a signal, which corresponds to the current through the switching element, being supplied to a control input of the threshold value element, and with the hold circuit being designed to switch off the switching element via the threshold value element when the maximum current through the switching element, which current is determined by the threshold value of the threshold value element, is reached and to set the timing element via the threshold value element wherein the hold circuit has: a hold switch, a first voltage divider with two impedances, whose center tap is connected to the control input of the threshold value element, with the switching path of the hold switch and the voltage divider being connected in series, with the hold circuit being designed to switch on the hold switch via the threshold value element when the maximum current through the switching element is reached, with the result that a current flows through the first voltage divider, and the potential at the control input of the threshold value element being set via the center tap of the first voltage divider in such a way that the switching element remains switched off.

2. The electronic ballast as claimed in claim 1, which is also designed to switch on the switching element after the demagnetization of the storage inductor by means of a demagnetization signal, namely a sudden change in the potential between the storage inductor and the diode after the demagnetization of the storage inductor.

3. The electronic ballast as claimed in claim 1, in which the hold circuit has: a second voltage divider with two impedances, whose center tap is connected to the control input of the threshold value element, which hold circuit is designed to use the demagnetization signal to set the potential at the control input of the threshold value element via the second voltage divider in such a way that the switching element is switched on by the threshold value element.

4. The electronic ballast as claimed in claim 3, in which the hold circuit has an isolating diode, which is connected between the two impedances of the first voltage divider and which is also connected between the control input of the threshold value element and the impedance which is switched so as to face the hold switch, with the electronic ballast being designed to allow a connecting node between the isolating diode and the impedance which is switched so as to face the hold switch to experience a potential shift in response to the demagnetization signal, with the result that the isolating diode turns off, and to set the potential at the control input of the threshold value element via the second voltage divider in such a way that the switching element is switched on by the threshold value element.

5. The electronic ballast as claimed in claim 3, in which the hold circuit has: a second voltage divider with two impedances, whose center tap is connected to the control input of the threshold value element and in which the hold circuit is designed to switch off the hold switch as soon as the time determined by the timing element has elapsed, and to set the potential at the control input of the threshold element via the second voltage divider in such a way that the switching element is switched on by the threshold value element.

6. The electronic ballast as claimed in claim 4, with a transistor, whose switching path is connected between the connecting node between the impedance, which faces the hold switch, of the first voltage divider and the isolating diode and the reference potential and which is switched on via its control input by the demagnetization signal, with the result that the potential at the connecting node experiences a potential shift and the isolating diode turns off.

7. The electronic ballast as claimed in claim 3, in which the hold circuit has an isolating diode, which is connected between the two impedances of the first voltage divider and which is also connected between the control input of the threshold value element and the impedance, which is switched so as to face the hold switch, with a first signal line, which connects the control input of the threshold value element to a control apparatus of the electronic ballast via the isolating diode, with the result that the control apparatus can switch on the switching element via the first signal line.

8. The electronic ballast as claimed in claim 1, in which the timing element has a series circuit comprising a resistor and a capacitor and in which the hold circuit has a diode, which is connected in parallel with the resistor of the timing element, in order to make it possible to rapidly discharge the capacitor once the timing element has been reset.

9. The electronic ballast as claimed in claim 1, in which a capacitor is connected in parallel with the timing element.

10. The electronic ballast as claimed in claim 1, with a second signal line, which connects the control input of the threshold value element to a control apparatus of the electronic ballast, with the control apparatus being designed to supply a modulating voltage thereto.

11. The electronic ballast as claimed in claim 10, in which the control apparatus of the electronic ballast is designed to supply a voltage, which is proportional to the instantaneous value of the voltage of the supply, to the control input of the threshold value element via the second signal.

12. The electronic ballast as claimed in claim 2 with a capacitor, which is connected to the potential between the storage inductor and the diode of the step-up converter, for coupling out the sudden change in potential between the storage inductor and the diode-after the demagnetization of the storage inductor (L).

13. The electronic ballast as claimed in claim 2 with a winding, which is secondary to the storage inductor of the step-up converter, for detecting the demagnetization of the storage inductor.

14. The electronic ballast as claimed in claim 1 with a third signal line, which is connected to the control input of the switching element, with the result that the switching element can be blocked by a control circuit via the third signal line.

15. The electronic ballast as claimed in claim 1 with a resistor, which is connected between the supply potential of the intermediate circuit capacitor and the control input of the switching element and via which, for automatic stimulation of the oscillation, the voltage across the intermediate circuit capacitor switches on the switching element.

16. The electronic ballast as claimed in claim 12, with a third signal line, which is connected to the control input of the switching element, with the result that the switching element can be blocked by a control circuit via the third signal line in which a control input of a threshold value element of the step-up converter for driving the switching element is connected both to the potential between the storage inductor and the diode via a capacitor and at least one resistor and to the potential between the switching element and a measuring resistor via at least one resistor.

17. The electronic ballast as claimed in claim 1 with a fourth signal line, which connects a control input of a threshold value element and a control circuit for driving the step-up converter and with which the threshold value element scan be switched by the control circuit, with the result that the self-excited oscillation of the switching element can start up.

18. The electronic ballast as claimed in claim 1, with a comparator and a driver circuit, which is connected downstream of the comparator, for driving the switching element in the step-up converter.

19. The electronic ballast as claimed in claim 18, in which an input of the comparator is connected to the potential between the storage inductor and the diode via at least one resistor and a capacitor, with a capacitor being connected in parallel with said resistor, with the result that the sudden change in potential between the storage inductor and the diode after the demagnetization of the storage inductor is transmitted differentially to the input of the comparator.

20. The electronic ballast as claimed in claim 18, in which a DC voltage is superimposed on an input signal of the comparator, with the result that the signal-to-noise ratio between the reference potential and this input signal is increased.

21. The electronic ballast as claimed in claim 18, in which a reference voltage, which is proportional to the instantaneous value of the voltage of the supply, is supplied to the comparator.

22. The electronic ballast as claimed in claim 1 for the optional operation of a discharge lamp directly on a mains supply or using a phase gating dimmer, with sudden changes in the supply voltage being coupled out by a differentiator, which is connected between one of the mains lines and the reference potential of the ballast, and being fed to a controller of the ballast, with the result that the controller can decide between operation using the phase gating dimmer and operation on the mains supply.

23. The electronic ballast as claimed in claim 22, in which the controller controls the step-up converter in such a way that said step-up converter, during operation on the mains supply, has a lower gate turn-off current threshold, with the result that the step-up converter draws a current with a lower amplitude from the mains supply than during operation using the phase gating dimmer.

24. A discharge lamp with an integrated electronic ballast as claimed in claim 1.

* * * * *